March 29, 1927.  1,622,784

F. W. HILD

SYSTEM OF CONTROL

Original Filed Jan. 25, 1923  3 Sheets-Sheet 1

WITNESSES:
R. J. Butler.
W. R. Coley

INVENTOR
Frederic W. Hild.
BY
Wesley G. Carr
ATTORNEY

UNITED STATES PATENT OFFICE.

FREDERIC W. HILD, OF LOS ANGELES, CALIFORNIA.

SYSTEM OF CONTROL.

Application filed January 25, 1923, Serial No. 614,939. Renewed December 17, 1925.

My invention relates to control systems and apparatus, and it has particular relation to apparatus and control systems for oil-well or other earth drilling, and the like.

In my copending application, Serial No. 454,451, filed March 22, 1921, for a power-transmission system, I have shown an electrical system that is particularly adapted for oil-well drilling and the like, wherein a pair of motors are connected to opposite sides of a differential gear device, the intermediate or controlled member of which acts as a cable-winding drum for the drilling member, which is suspended from a derrick in the usual way. As fully explained in the above-identified application, one of the motors directly drives the rotary table for the drill, while the other performs a regulating function with respect to variations of pressure at the drill point and is always energized proportionately to the effective weight of the drilling mechanism proper, i. e., the total weight of the suspended drilling device minus the contact pressure.

One object of my invention is to provide a system of speed regulation for the drilling lay-out just described, whereby a definite limiting power or contact-pressure difference, of substantial magnitude, from a changing maximum value is maintained under all drilling conditions.

Another object of my invention is to provide a simple automatic means for measuring and indicating pressures on the drill bit for all drilling conditions and depths of operation.

A further object of my invention is to provide a meter or measuring device wherein a combination of indicating maximum demand "pressure limit" elements are employed, together with certain novel operating and interdependent features for special purposes to be set forth.

Another object of my invention is to provide a control system employing a duplex regulator for simultaneously varying the voltage applied to a pair of induction motors, or the like, in opposite directions.

Other objects of my invention will become evident from the following detailed description, taken in conjunction with the accompanying drawings, wherein, Figure 1 is a plan view of a combined meter device constructed in accordance with my present invention.

Figure 1:
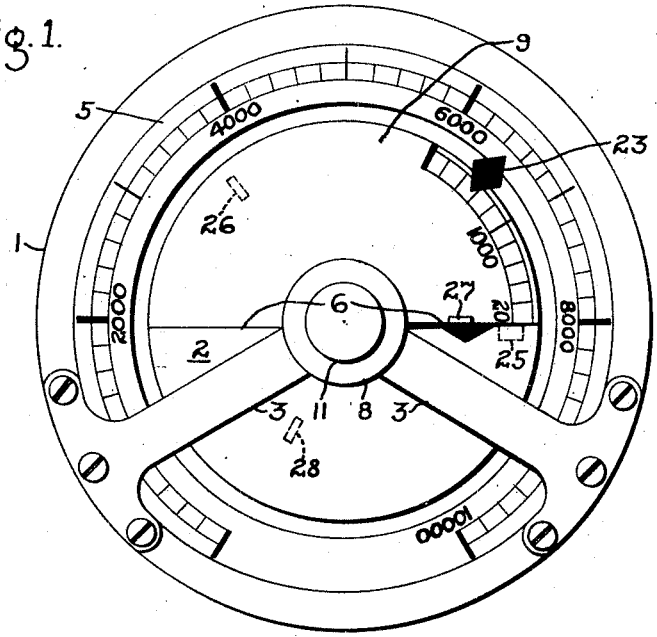

Referring to Fig. 1 of the drawings, the structure here shown comprises a suitable casing member 1 upon which is suitably mounted a bracket 2 having a pair of angularly related arms 3 that are preferably integrally associated. The bracket 2 is adapted to support certain of the movable meter elements, as subsequently described in detail.

The meter is provided with a suitable glass face or front 4 for enclosing the usual opening in the casing member 1. An annular stationary dial member 5 is suitably secured within the casing a short distance below the outer area of the glass face 4 while a movable dial or "maximum demand" segment 6, which may be semi-circular in form, is rigidly secured to a sleeve 7 that extends upwardly through the glass face 4 and the bracket 2 and terminates in a knob or thumb nut 8, whereby the segment 6 may be manually adjusted or positioned.

A second movable or "pressure limit" dial 9, of circular shape, is located below the movable segment 6 and in substantial lateral alignment with the stationary dial 5. A centrally located pin or shaft 10 is rigidly secured to the movable dial 9 and extends upwardly through the sleeve 7 into a knob or thumb nut 11 that is located above the larger knob 8. In this way, the movable dial 9 may also be manually adjusted by means of the knob 11, but, under ordinary operating conditions, the dial 9 moves with the segment 6 by reason of the interposition of a friction band or ring 7ª within the sleeve 7 to suitably grip the shaft 10.

A single-phase wattmeter element 12 is located within the casing 1 beneath the various dial members to actuate an indicating pointer arm 13, for a control purpose to be subsequently set forth in detail. A combined driving and brake mechanism 14 for the movable segment 6, preferably of a familiar clock-work type, is also located within the casing 1.

The wattmeter element 12 may be of any familiar form comprising, essentially, a voltage coil 16 that is wound upon a suitable polar projection 17 and a current coil 18 that is wound upon a pair of suitable polar projections 19, all of the polar projections being disposed in the usual magnetic circuit. A rotatable disc 20 is adapted to be jointly actuated by the fluxes from the several polar projections and is rigidly secured to a spindle 21 to which the arm 13 is affixed. The spindle 21 is suitably mounted within the casing 1 and is provided with a spiral spring 22, in accordance with the usual practice.

The indicating pointer arm 13 is of right-angle form and the outer end thereof is provided with a flat pointer 23 to which is secured a suitable U-shaped flexible contact member 24. This contact member is adapted to engage either contact segment 25, mounted upon the lower side of maximum demand segment 6, or contact segment 26, mounted upon the upper side of pressure-limit dial 9, dependent upon the operating position of the pointer arm 13, as subsequently explained. The movable segment 6 is further provided with a contact member 27 for engaging a stationary contact member 28 in the zero or off position of the segment 6, for a purpose to be set forth in connection with Fig. 3.

The clock-work device 14 comprises a suitable base member 30 for supporting a brake coil 31 and a movable brake arm 32 that is biased toward the illustrated position by means of a suitable coil spring 33. The free end of the brake arm 32 is provided with a flexible brake shoe 34 for engaging an escapement wheel 35, or the like, of a suitable clock work mechanism 36. Under the illustrated condition of deenergization of the brake coil 31, the escapement wheel 35 is held stationary by the brake shoe 34, but upon energization of the coil 31, the brake arm 32 is actuated away from the escapement wheel 35, whereby the clock-work mechanism 36 may drive a pinion 37 that meshes with the toothed outer surface of the movable segment 6.

The indicating pointer 23 is adapted to register upon the stationary dial 5 the instantaneous drilling pressure, as subsequently explained, while the movable segment 6 corresponds to a "maximum demand" element and is set to correspond to the full weight of the rotary drilling device. The movable dial 9 corresponds to the limiting drill-contact pressure that it is desirable to employ and may also be set to correspond to drilling conditions.

Figure 2:
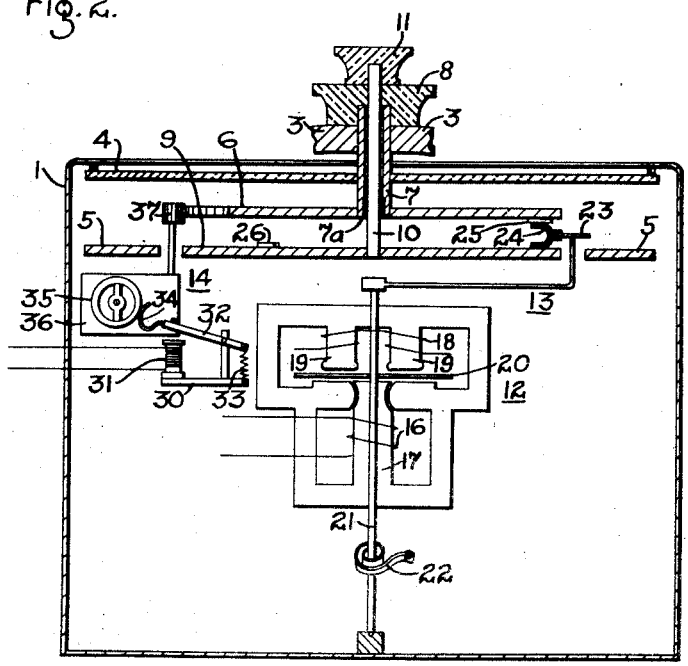
Fig. 2 is a view, partly in elevation and partly in section, of the apparatus shown in Fig. 1.
Figure 3:
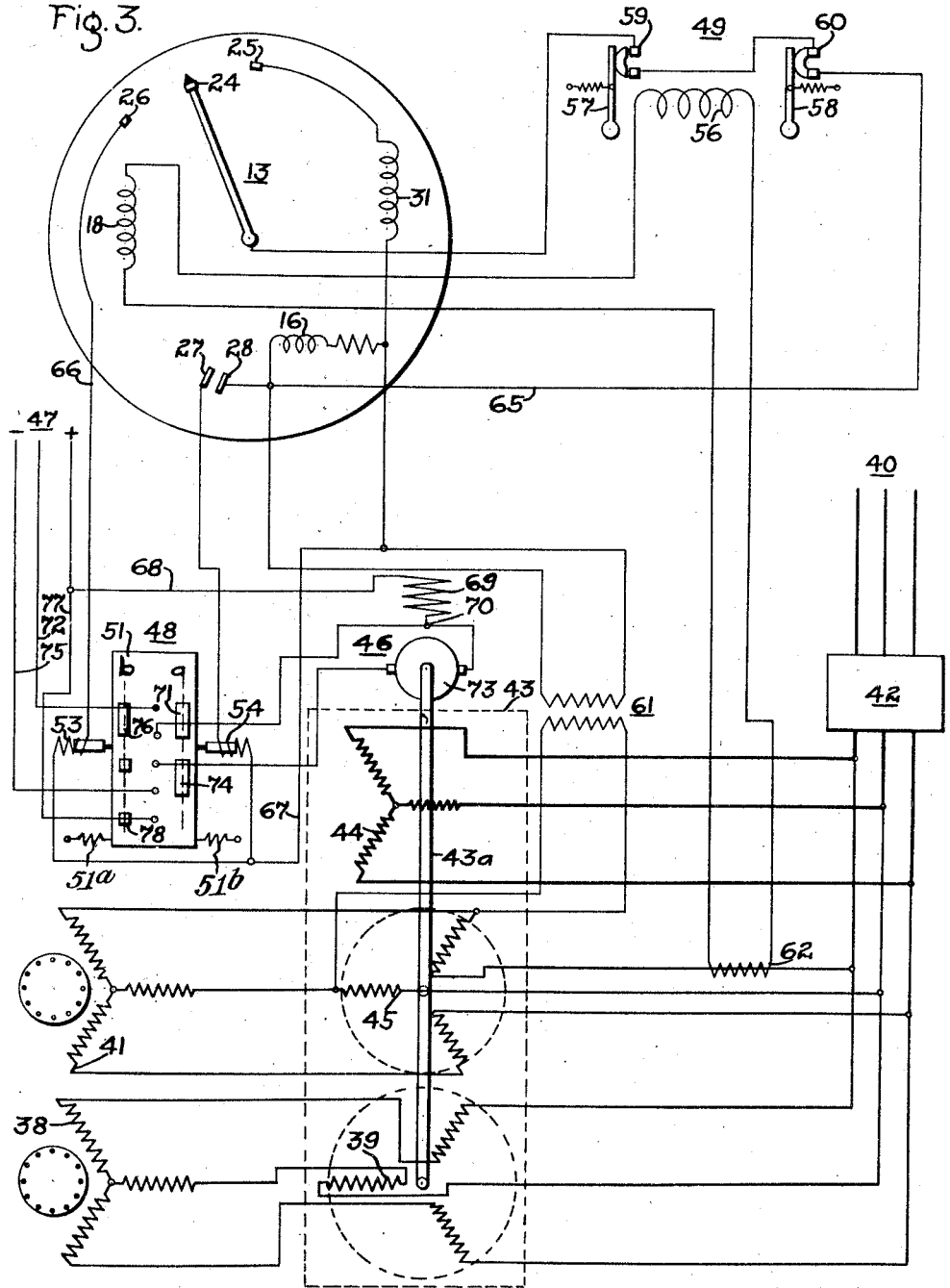
Fig. 3 is a diagrammatic view of a control or regulating system that is adapted to be operated in accordance with the action of the apparatus illustrated in Fig. 1.

Reference may now be had to Fig. 3, wherein the illustrated control system comprises the various coils and contact members of the meter that is illustrated in Figs. 1 and 2, together with a source of three-phase energy 40 for supplying power to a plurality of induction motors 38 and 41, which respectively correspond to the table-driving motor and to the auxiliary motor, energized in accordance with the effective weight of the drilling device, as employed in the system that is set forth in my above-identified copending application.

A suitable auto starter, or the like, 42 is provided to connect the motors 38 and 41 to the source of energy 40, under operating conditions, through the medium of an induction regulator 43. This regulator comprises a stationary primary winding 44 of any suitable type and a plurality of rotatable secondary windings 39 and 45 that are respectively connected in circuit with the primary windings of the induction motors 38 and 41. The secondary members 39 and 45 may be driven through the agency of a common shaft 43a that is suitably associated with a pilot motor, or the like, 46, which is mounted upon the top of the induction regulator.

However, the respective windings of the two rotative elements 39 and 45 of the induction regulator are wound 180 electrical degrees out of phase with each other, as illustrated. Moreover, one of these secondary members initially occupies its position of maximum "boost" while the other simultaneously occupies its position of maximum "buck". Consequently, a slight movement of the pilot motor 46 will tend to increase the voltage applied to one of the induction motors 38 and 41 at the same time that the voltage upon the other is decreased. In this way a very sensitive regulation is secured, inasmuch as a relatively great variation in the speed of the induction motors is obtained by means of a relatively small movement of the pilot motor 46. It will be understood that other means, such as separate rotors geared to rotate in opposite directions, may be employed for securing the duplex regulating feature that is desired and that the present showing is given for illustrative purposes only.

A second source of energy, preferably a three-wire, direct-current source 47, is provided for energizing the pilot motor 46 through the agency of a drum switch 48 and an overload-no-current relay 49. The drum switch 48 may comprise a suitable body member or drum 51 upon which suitable control fingers and contact segments are mounted, as subsequently described in detail. For the purpose of actuating the drum switch into the one or the other of its operative positions from the illustrated neutral position, a pair of actuating solenoids 53 and 54, which are adapted to operate the drum in opposite directions, or any other equivalent device, may be employed. The drum 51 is normally maintained in its neutral position by means of centering springs 51a and 51b.

The overload-no-current-relay 49 may comprise an operating coil 56 and a plurality of movable switch arms 57 and 58. The switch arm 57 is normally biased toward its open position to break contact with a pair of stationary contact members 59, while the other switch arm 58 is normally biased to engage a pair of stationary contact members 60. The contact members 59 and 60 are connected in series relation, so that an open circuit in connection with either pair of contact members will interrupt the subsequently traced circuit to the pilot motor 46.

In case of an overload current, the switch arm 58 is actuated by the coil 56 to disengage contact members 60, whereas under no-current conditions the de-energization of the coil 56 permits the switch arm 57 to be actuated to open position. The device just described thus acts both as an overload current protection and also as a no-load protective device.

A small voltage transformer 61, connected across one phase of the auxiliary induction motor 41, is adapted to energize the voltage coil 16 of the illustrated meter device, as well as furnish energy for other control circuits to be traced. A small current transformer 62 that is energized in accordance with the primary current of the auxiliary induction motor 41 is connected through the operating coil 56 of the overload-no-current relay 49 and the current coil 18 of the illustrated meter device.

As previously explained, the induction motor 38 is adapted to directly drive the rotary table for the drill, while the auxiliary motor 41 is associated therewith through the agency of a differential gear device and is always energized in accordance with the load or effective weight of the suspended drilling member.

The current coil 18 of the meter device is energized responsively to the primary current of the induction motor 41 and the voltage coil 16 is energized in accordance with the voltage applied to the primary winding of the same motor. The indicating arm 13 of the meter device thus registers in accordance with the usual operation of a single-phase wattmeter device. The movable segment 6, as previously mentioned, corresponds to a maximum demand meter element and, in the present instance, is adapted to be carried forward by the active pointer arm 13 through the interposition of the clock-work mechanism 14, in order that the mechanical work of actuating the maximum demand segment 6 may not be directly imposed upon the pointer arm 13, whereby inaccuracies might arise through friction or insufficient torque of the pointer arm.

The maximum-demand segment will thus always indicate a value corresponding to the maximum torque required of the auxiliary induction motor 41 under operating conditions. The ultimate value of this torque is proportional to the full suspended weight of the drilling element. As the drill pipe lengthens during the drilling operation, or as the weight increases by reason of the unwinding of the drill cable from the drum, the maximum demand segment 6 will be automatically advanced, by reason of the action of the clock-work mechanism 14, whenever the contact member 24 of the pointer arm 13 and the contact member 25 of the movable segment 6 come into engagement, as subsequently described in detail.

Whenever the drill touches the bottom of the hole, the effective weight is diminished by the full contact pressure if a single line on the tackle is employed, but is diminished by the contact pressure divided by the number of lines, if two or more lines on the tackle are employed, as the depth of the hole increases and additional lengths of pipe are added to the drilling element. In order to properly compensate for the different numbers of lines or to make adjustments for different predetermined limits of contact pressure, the pressure limit dial 9 may be actuated manually by the thumb nut 11 to the desired angular relation with respect to the maximum demand segment 6.

Under the operating conditions just mentioned, the active or indicating pointer arm 13 will move backwardly from the maximum demand segment 6, or, in other words, the effective weight of the controlling element is equal to the maximum suspended weight thereof minus the contact pressure divided by the number of lines in the tackle. Thus the meter instrument will always exactly measure the pressure on the drill bit divided by the number of lines in the tackle, and by properly calibrating the scales, as indicated in Fig. 1, direct readings of the contact pressures may be secured. Consequently, a simple automatic means is provided for measuring and indicating the pressure of the drill bit for all conditions and depths of drilling.

Assuming that the indicating pointer arm 13 moves in a clockwise direction until contact member 24 thereof engages contact member 25 on the maximum demand segment 6, a circuit is established from one terminal of the auxiliary transformer 61 through conductor 65, contact members 60 and 59 of the relay 49, indicating arm 13, contact members 24 and 25, now in engagement, brake coil 31 of the clock-work mechanism 14 and thence to the opposite side of the auxiliary transformer 61. In this way the brake coil 31 is energized to remove the brake member 34 from the escapement wheel 35. The clock-work mechanism 36 thus drives the maximum demand segment 6, through the agency of pinion 37, as long as the indicating pointer arm continues to move to the right, until a figure corresponding to the maximum weight of the drilling element is reached, if the operation is carried so far. The decrease of torque on the indicating pointer arm 13 causes the contact members 24 and 25 to separate, whereby the brake coil 31 is deenergized and the brake 34 is reset. The maximum segment 6 will thus come to rest while the indicating pointer arm 13 is free to operate.

The movable dial 9, corresponding to the limiting permissible pressure at the drill point, is secured by friction to the maximum demand segment 6, as previously described, so that the dial 9 is always moved positively by the segment 6 to thus maintain a constant difference or operating range of substantial magnitude with respect to the changing maximum value as registered by the segment 6. However, the setting of the movable dial 9 with respect to the segment 6 is manually adjustable, as previously described, to correspond to the particular drilling conditions.

Assuming that the movable dial 9 is set at an angle with respect to the maximum demand segment 6 corresponding to the relative positions of contact members 25 and 26 in Fig. 3, and that the indicating pointer arm 13 moves backwardly from the maximum demand segment 6 until the pressure limit is reached, corresponding to the engagement of contact segment 24 on the pointer arm 13 and contact segment 26 on the movable dial 9, an auxiliary circuit is established from the auxiliary transformer 61 through relay 49 and pointer arm 13, contact members 24 and 26, conductor 66, actuating coil 53 of the drum switch 48 and conductor 67 to the opposite side of the transformer 61. The drum switch 48 is thus actuated to its right hand postion $a$.

A circuit is thereupon established from the positive side of the direct-current source of energy 47 through conductor 68, field winding 69 of the pilot motor 46 to junction point 70, where the circuit divides, one branch including contact segment 71 of the drum switch 48, which bridges a pair of control fingers thereof, and neutral conductor 72 of the three-wire source of energy 47. The other branch includes armature 73, contact segment 74 of the drum switch 48—which bridges a pair of control fingers thereof—and negative conductor 75 of the source of energy 47.

Upon such concurrent energization of the armature and field winding of the pilot motor 46, the induction regulator 43 is operated to simultaneously and oppositely vary the voltages impressed upon the main driving motor 38 and the auxiliary or regulating motor 41, as previously described.

Since the readings of the indicating pointer arm 13 are proportional to the contact pressure divided by the number of lines in the tackle, as heretofore explained, it follows that whenever the driller changes bit diameters or the number of lines he should accordingly reset the movable dial 9 corresponding to the pressure limit. The present instrument is adapted to effect the return of the induction regulator 43 to its initial or starting position each time that the driller resets the pressure limit dial 9.

This result is produced by a movement of the mamimum-demand segment 6 to its zero position by means of the knob 8, whereby contact members 27 and 28 come into engagement. Under these conditions, a circuit is established from one terminal of the auxiliary transformer 61 through contact members 28 and 27, actuating coil 54 of the drum switch 48 and thence through conductor 67 to the opposite terminal of the transformer 61. The drum switch 48 is thus actuated to its position $b$.

A new circuit is thereby established from the positive terminal of the source of energy 47 through conductor 68, field winding 69 in the same direction as previously traced, junction-point 70, contact segment 76, which is bridged by a pair of control fingers of the drum switch 48, and neutral conductor 72 of the source of energy 47. Another circuit is completed from the positive terminal of the source of energy 47 through conductor 77, contact segment 78 of the drum switch 48—which is bridged by a pair of control fingers thereof—and thence through armature 73 of the pilot motor 46, in the opposite direction from that previously taken, to junction-point 70, whence circuit is completed as traced above.

Consequently, the induction regulator 43 is automatically returned to its initial position, corresponding to maximum "boost" for one of the induction motors and maximum "buck" for the other whenever the maximum demand segment 6 is returned to its zero postion. After the operation the driller may set his pressure limit dial 9 to the desired new location, as explained above.

Figure 4:
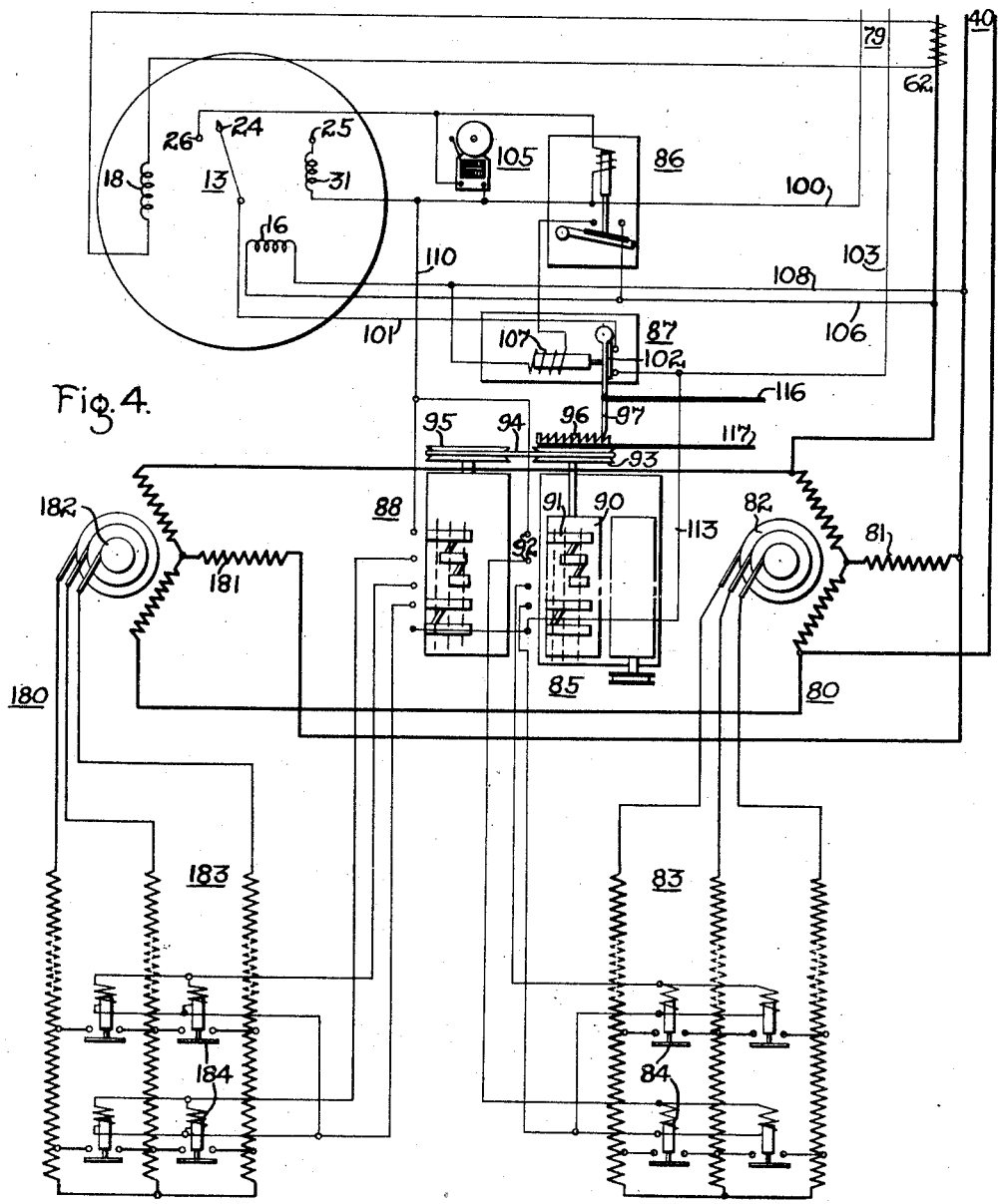
Fig. 4 is a diagrammatic view of a modified form of control system employing the meter apparatus in question.

Referring to Fig. 4, the system here shown comprises the previously described meter device, the three-phase source of energy 40, a source of direct-current energy 79, and a plurality of wound-rotor type induction motors 80 and 180, respectively having primary windings 81 and 181 and secondary windings 82 and 182 that are connected to suitable resistors 83 and 183, the effective values of which may be varied by means of a plurality of contactors 84 and 184, respectively.

A controller 85 is provided for governing the several contactors 84 to increase or decrease the speed of operation of the motor 80, which corresponds to auxiliary motor 41 in the system that is shown in Fig. 3.

A relay device 86 is adapted to be controlled by the indicating arm 13 of the meter device, whereby a controller-actuating device 87 may be governed to effect a step-by-step actuation of the speed-governing controller 85.

Another controller 88 may be utilized for governing the several contactors 184 to vary the operating speed of motor 180, which corresponds to motor 38 shown in Fig. 3. The controller 85 is shown as provided with a drum 90, or the like, upon which a contact segment 91 is mounted to engage a plurality of control fingers 92, in the desired sequence, for operating the contactors 84 to gradually short-circuit or insert in circuit the secondary resistor 83. The controller 88 is of a similar character and need not be further described, except to state that the arrangement of contact members is such that the resistor 183 is manipulated in the opposite manner to the control of the resistor 83; that is, the resistor 183 is gradually inserted in circuit as the resistor 83 is gradually cut out of circuit and vice versa. The illustrated control system thus corresponds in function to the regulator system that is shown in Fig. 3.

The operating shaft of the drum 90 is provided with a sheave 93, which is connected by means of a cable or chain 94 to a second sheave 95 for operating controller 88. A ratchet or toothed member 96 is integrally or otherwise secured to the upper side of the sheave 93 for cooperating with a pawl member 97 of the actuating device 87.

The operation of this system may be set forth as follows: Upon movement of the indicating arm 13, as previously described, toward the right until engagement between contact members 24 and 25 is effected, a circuit is established from one terminal of direct-current source 79 through conductor 100, brake coil 31, contact members 25 and 24, indicating arm 13, conductor 101, cooperating contact members 102 of the pawl member 97 in its normal circuit-closing position, and conductor 103 to the negative side of the supply source. The brake member 34 (Fig. 2) is thus released to permit operation of the clock-work mechanism 36, which actuates the movable segment 6 and movable dial 9 along with the indicating arm 13, as previously explained.

On the other hand, if indicating arm 13 swings to the left until engagement is effected between contact members 24 and 26, a circuit is established from the positive supply-circuit conductor 100 through a bell or other alarm device 105, whereby the operator is warned of the existence of the pressure-limit conditions. A second circuit is concurrently established through the actuating coil of the relay device 86, contact members 26 and 24, indicating arm 13 and thence to the negative supply-circuit conductor 103, as previously described.

Upon the closure of relay 86 a new circuit is established from one of the polyphase supply-circuit conductors through conductor 106, contact members of the relay device 86, actuating coil 107 of the controller-operating device 87 and conductor 108 to another of the three-phase supply conductors. The magnetizable pawl member 97 is thus actuated toward the left to operate controllers 85 and 88 forward one notch through the agency of the ratchet device 96. The secondary resistors 83 and 183 are thus respectively gradually inserted in and excluded from circuit, or vice versa, for a purpose already set forth.

Only one step will be taken by the controllers, provided proper speed conditions are thus obtained. Otherwise, the pawl member 97 will return to its normal position by reason of the interruption of contact between contact members 102 and the consequent dropping of the relay 86 and deenergization of the coil 107. However, if one step of control is insufficient to meet the new conditions, another step will be taken as soon as the pawl 97 returns to its illustrated position, as will be understood, and additional steps will be successively effected so long as the contact members 24 and 26 of the meter device remain in engagement.

In order to permit manual operation by the driller, in case such operation is desired, a wire or cable 116 is shown as attached to the pawl member 97, whereby the pawl member may be actuated to a position entirely free of the ratchet member 96. A wire or cable 117, operating upon the sheave 93, may then be actuated to operate the controllers by hand.

I do not wish to be restricted to the specific structural details, circuit connections or arrangement of parts herein set forth, inasmuch as various modifications thereof may be made without departing from the spirit and scope of my invention. I desire, therefore, that only such limitations may be imposed as are indicated in the appended claims.

I claim as my invention:

1. In a control system for a variable load, the combination with driving means for said load, of means for maintaining a definite limiting power difference from the changing maximum value of said load in the operation of said driving means.

2. In a control system for a variable load, the combination with electric motor means for driving said load, of means for electrically maintaining a fixed range of regulation below the changing maximum value of said load in the operation of said electric motor means.

3. In an earth-drilling system, the combination with means adapted to drive the variable drilling load, of means for maintaining a definite limiting difference of drilling pressure below the changing maximum value of said load in the operation of said driving means.

4. In an earth-drilling system, the combination with electric motor means adapted to drive the variable drilling load, of means for electrically maintaining a fixed range of regulation of the drilling pressure below the changing maximum value of said load in the operation of said electric motor means.

5. In an earth-drilling system, the combination with means adapted to drive the variable drilling load, of automatic means for continuously measuring the varying pressures on the drilling element under all operating conditions.

6. In an earth-drilling system, the combination with electric motor means adapted to drive the variable drilling load, of means for electrically measuring and indicating the varying pressures on the drilling element under all operating conditions.

7. In a control system for a variable load, the combination with electric driving means for said load, of regulating means for said driving means, and means for operating said regulating means upon a predetermined departure from the changing maximum value of said load.

8. In a control system for a variable load, the combination with electric motor means for driving said load, of an induction regulator for said electric motor means, and means for rendering said regulator effective upon a fixed departure from a variable limiting value of said load.

9. In an earth-drilling system, the combination with electric means adapted to drive the variable drilling load, of regulating means for said driving means, and means for operating said regulating means upon a predetermined departure of drilling pressure from the changing maximum value of said drilling load.

10. In an earth-drilling system, the combination with electric motor means adapted to drive the variable drilling load, of an induction regulator for said electric motor means, and means for rendering said regulator effective upon a fixed departure of drilling pressure from a variable limiting value of said load.

11. In an earth-drilling system, the combination with means adapted to drive the variable drilling load having a maximum value corresponding to the dead weight of the drilling element, of means for maintaining a fixed range of increased drilling pressure corresponding to a predetermined decrease in the effective weight of said element.

12. In an earth-drilling system, the combination with means adapted to drive the variable drilling load having a maximum value corresponding to the dead weight of the drilling element, of means for maintaining a fixed range of increased drilling pressure corresponding to a predetermined decrease in the effective weight of said element, irrespective of changes in said maximum value under various operating conditions.

13. In an earth-drilling system, the combination with electric motor means adapted to drive the variable drilling load having a maximum value corresponding to the dead weight of a drilling element, of means for electrically maintaining a fixed range of increased drilling pressure corresponding to a predetermined decrease in the effective weight of said element.

14. In an earth-drilling system, the combination with electric motor means adapted to drive the variable drilling load having a maximum value corresponding to the dead weight of the drilling element, of means for electrically maintaining a fixed range of increased drilling pressure corresponding to a predetermined decrease in the effective weight of said element, irrespective of changes in said maximum value under various operating conditions.

15. In an earth-drilling system, the combination with electric motor means adapted to drive the variable drilling load having a maximum value corresponding to the dead weight of the drilling element, of regulating means for said electric motor means, and means for operating said regulating means upon a fixed departure from said maximum value corresponding to a predetermined increase in drilling pressure.

16. In an earth-drilling system, the combination with electric motor means adapted to drive the variable drilling load having a maximum value corresponding to the dead weight of the drilling element, of an induction regulator for said electric motor means, and means for rendering said regulator effective upon a fixed decrease from said maximum value corresponding to a predetermined increase in drilling pressure.

17. In an earth-drilling system, the combination with electric motor means adapted to drive the variable drilling load having a maximum value corresponding to the dead weight of the drilling element, of regulating means for said electric motor means, and means for operating said regulating means upon a fixed departure from said maximum value corresponding to a predetermined increase in drilling pressure, irrespective of changes in said maximum value under various operating conditions 18. In an earth-drilling system, the combination with electric motor means adapted to drive the variable drilling load having a maximum value corresponding to the dead weight of the drilling element, of an induction regulator for said electric motor means, and means for rendering said regulator effective upon a fixed decrease from said maximum value corresponding to a predetermined increase in drilling pressure, irrespective of changes in said maximum value under various operating conditions.

19. In an earth-drilling system, the combination with driving means for the variabe drilling load comprising a plurality of electric motors one of which is energized in accordance with the effective weight of the drilling element, of means energized in accordance with the electrical load of said one motor for maintaining a constant limiting difference from the variable maximum effective weight of said drilling element.

20. In an earth-drilling system, the combination with driving means for the variable drilling load comprising a plurality of electric motors one of which is energized in accordance with the effective weight of the drilling element, of regulating means for said motors, and means energized in accordance with the electrical load of said one motor for effecting the operation of said regulating means upon a predetermined increase in drilling pressure, corresponding to a predetermined decreased effective weight of said drilling element below the maximum effective weight thereof.

21. In an earth-drilling system, the combination with electric means adapted to drive the variable drilling load, of governing means for said driving means, and means for operating said governing means in a step-by-step manner upon a predetermined departure of drilling pressure from the changing maximum value of said drilling load.

22. In an earth-drilling system, the combination with electric motor means adapted to drive the variable drilling load, of a plural-position controller for governing said motor means, and means for operating said controller in a step-by-step manner upon a fixed departure of drilling pressure from a variable limiting value of said load.

23. In an earth-drilling system, the combination with an induction motor employed in driving the variable drilling load, of a resistor in circuit with the rotor of said induction motor, a plural-position controller for governing said resistor; and means energized in accordance with the electrical load of said motor for operating said controller in a step-by-step manner upon a predetermined departure of drilling pressure from the variable maximum value of said drilling load.

24. In an earth-drilling system, the combination with a plurality of dynamo-electric machines adapted to operate the variable drilling load, a plurality of governing means for said operating means, and means for operating said governing means to effect different control of the respective machines upon a predetermined departure of drilling pressure from a given value of said load.

25. In an earth-drilling system, the combination with a plurality of dynamo-electric machines adapted to operate the variable drilling load, of a plurality of controllers for said operating means, and means for operating said controllers to simultaneously reduce the speed of one machine and increase the speed of another upon a fixed departure of drilling pressure from a variable limiting value of said load.

26. In an earth-drilling system, the combination with a plurality of induction motors adapted to operate the variable drilling load, of resistor means for varying the speed of said motors, a plurality of controllers for governing said resistors, and means responsive to the contact pressure of the drilling element for operating said controllers to respectively insert said resistor means in and exclude it from the circuit of said motors.

27. In an earth-drilling system, the combination with a plurality of induction motors adapted to operate the variable drilling load, of a plurality of resistors in circuit with the rotors of the respective motors, a plurality of controllers for governing said resistors, and means energized in accordance with the electrical load of one of said motors for operating said controllers in a step-by-step manner upon a predetermined departure of drilling pressure from the variable maximum value of said drilling load to simultaneously increase the effective value of one resistor and decrease that of another.

28. In a rotary earth-drilling system, the combination with driving means for the variable drilling load comprising a plurality of induction motors one of which is energized in accordance with the effective weight of the drilling element, of voltage regulating means for said motors, and means energized in accordance with the electrical load of said one motor for effecting the operation of said regulating means upon a predetermined increase in drilling pressure, corresponding to a predetermined decreased effective weight of said drilling element below the maximum effective weight thereof.

29. In a rotary earth-drilling system, the combination with a plurality of induction motors adapted to operate the variable drilling load, of a plurality of resistors in circuit with the rotors of the respective motors, a plurality of controllers for governing said resistors, means energized in accordance with the electrical load of one of said motors for operating said controllers in a step-by-step manner upon a predetermined departure of drilling pressure from the variable maximum value of said drilling load to simultaneously increase the effective value of one resistor and decrease that of another, and manually operable means for governing the operation of said controllers.

30. Drilling machinery comprising an operating engine; a line shaft adapted to be rotated by said engine; a drum adapted to be rotated from said line shaft; and means for rotating and automatically controlling said drum, said means being controlled by the pressure of the operating medium of said engine.

31. A controlling device for a drum of a drilling machine comprising driving means driven by an engine and adapted to drive said drum; and means responsive to the pressure of the operating medium of the engine of said drilling machine for varying the speed and direction of rotation of said driving means.

In testimony whereof, I have hereunto subscribed my name this twentieth day of January, 1923.

FREDERIC W. HILD.